Jan. 13, 1942.    B. A. SEAVER    2,269,920
LAWN MOWER
Filed Sept. 7, 1940    3 Sheets-Sheet 1

INVENTOR,
Blake A. Seaver

Jan. 13, 1942.  B. A. SEAVER  2,269,920
LAWN MOWER
Filed Sept. 7, 1940  3 Sheets-Sheet 2

INVENTOR.
Blake A Seaver.

Jan. 13, 1942.   B. A. SEAVER   2,269,920
LAWN MOWER
Filed Sept. 7, 1940   3 Sheets-Sheet 3

INVENTOR.
Blake A Seaver

Patented Jan. 13, 1942

2,269,920

UNITED STATES PATENT OFFICE 2,269,920

LAWN MOWER

Blake A. Seaver, Springfield, Mass., assignor to Blair Manufacturing Company, Springfield, Mass., a corporation of Massachusetts Application September 7, 1940, Serial No. 355,747

2 Claims. (Cl. 56—249)

This invention relates to improvements in lawn mowers.

An object of this invention is to provide a lawn mower construction which is strong and durable, with the adjustable features positively locked so that they may be maintained indefinitely in adjusted position, unaffected by vibration and shock; which is pleasing in appearance, economical of manufacture, and which is composed of a minimum number of parts.

Another object of this invention is to provide, in a lawn mower construction, a lightweight, pressed metal wheel and hub, combined with a cast metal ring gear rigidly secured to the pressed metal wheel, thereby combining in one assembled unit the rigidity and accuracy of a cast gear and the light weight, economy of manufacture, and enhanced appearance of the pressed metal wheel.

A further object of this invention is to provide, in a lawn mower construction, improved and simplified means for adjusting, controlling, and locking the operating position of the stationary knife, relative to the cutting reel blades.

A still further object of this invention is to provide, in a lawn mower construction, means for positively locking the rear roller brackets in adjusted position, so that it is impossible for the roller to get out of alignment. It is customary to provide slots for the bracket bolts which support the rear roller, in order to provide adjustability for regulating the height of the cut. In operation, the bolts are apt to work loose, due to shock and vibration, and slip in the slots, thereby throwing the roller out of alignment with the axis of the wheels, resulting in an uneven cut, binding of the roller, and difficulty in operating the machine. It is an object of this invention to provide positive positioning means for the roller brackets, whereby the position of the roller, relative to the cutting reel, cannot change even when the roller bracket bolts become loose.

Again, it is an object of this invention to provide a lawn mower construction which will operate efficiently during its normal lifetime of service without lubrication other than that provided by the manufacturer.

It is also an object of this invention to provide, in a lawn mower construction, hollow side frames having smooth inner and outer surfaces, and which, when assembled with the wheels, provide complete sealing of the gears against the entrance of dirt and grass clippings.

These, and other objects and advantages of this invention will be more completely disclosed and described in the following specification, the accompanying drawings, and the appended claims.

Broadly, this invention comprises a lawn mower construction including rubber tired pressed metal wheels with cast ring gears secured therein, side frames having smooth, flat, outer and inner surfaces, the wheels being removably and rotatably supported on the side frames through self-lubricating bearings, a cutting reel provided with bearings manually adjustable to take up wear, a rolling clutch drive for the cutting reel, operatively connected to the wheel gears, a bottom knife cooperating with the cutting reel and provided with easily accessible, positively locking adjusting means, a rear roller mounted on reversible brackets whereby the spacing of the roller and bottom knife may be varied, and positive locking adjustment means for positioning the roller for controlling the height of the cut.

A preferred embodiment of this invention is illustrated in the accompanying drawings, in which—

Figure 1:
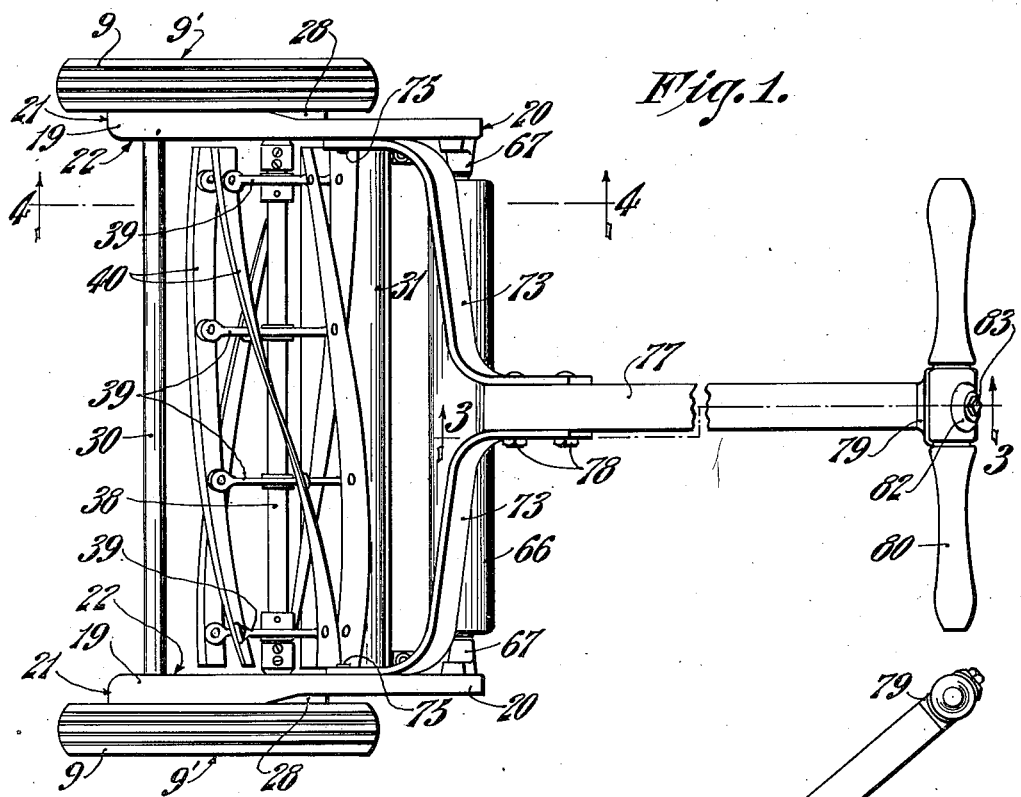
Fig. 1 is a plan view of the lawn mower.

Referring now to the drawings in detail, in which like numerals refer to like parts throughout, The wheels of the lawn mower include a pressed metal disc 1, rim 2, and hub sleeve 3. These parts are welded together to provide a strong, rigid, integral wheel. The disc 1 is formed with an axially extending flange 4 which is turned inwardly, relative to the lawn mower construction as a whole, and the rim 2 is welded or otherwise suitably secured to the outer surface of the flange 4. The flange 4 terminates in an outwardly extending flange 5, and the rim 2 is formed with a corresponding outwardly extending flange 6. The flanges 5 and 6 cooperate to form a circumferential groove 7 for receiving a bead 8 formed on a rubber tire 9. The wheel disc 1 is also formed with a recess 10 and perforated at 11 for receiving spring fingers 12 secured on a hub cap 13. The hub cap 13 is slightly crowned, and may be inscribed or embossed with any suitable design, and is removably secured on the wheel disc 1 by means of engagement of the fingers 12 in the perforations 11. The recess 10 is so formed to receive the hub cap 13 as to enclose the hub cap within the plane of the outer surface 14 of the wheel disc 1. The hub sleeve 3 is formed of pressed metal and has a flange 15 which is securely welded onto the wheel disc 1 and the sleeve 3 is axially aligned with the wheel disc 1, thus providing a rigid, accurately centered bearing for the wheel. Self lubricating bushings 16 are pressed into the hub 3 and spaced to provide an annular groove 17 which may be packed with grease is desired.

Figure 5:
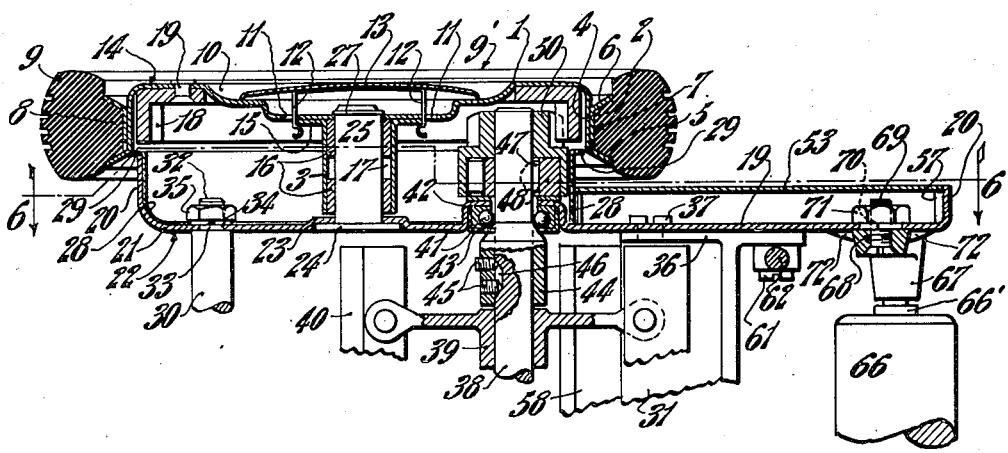
Fig. 5 is a sectional view taken on the line 5—5 of Fig. 4.

A ring gear 18 is secured in the wheel disc 1 by means of countersunk flat head rivets 19'. The construction of the tire 9, wheel disc 1, and rim 2 is such that, when assembled, the outer surface 9' of the tire 9 projects substantially beyond any metallic parts of the wheel, as best shown in Fig. 5. When the lawn mower is in use, this construction prevents damage to any vertical surface along which the lawn mower may be operated.

Figure 4:
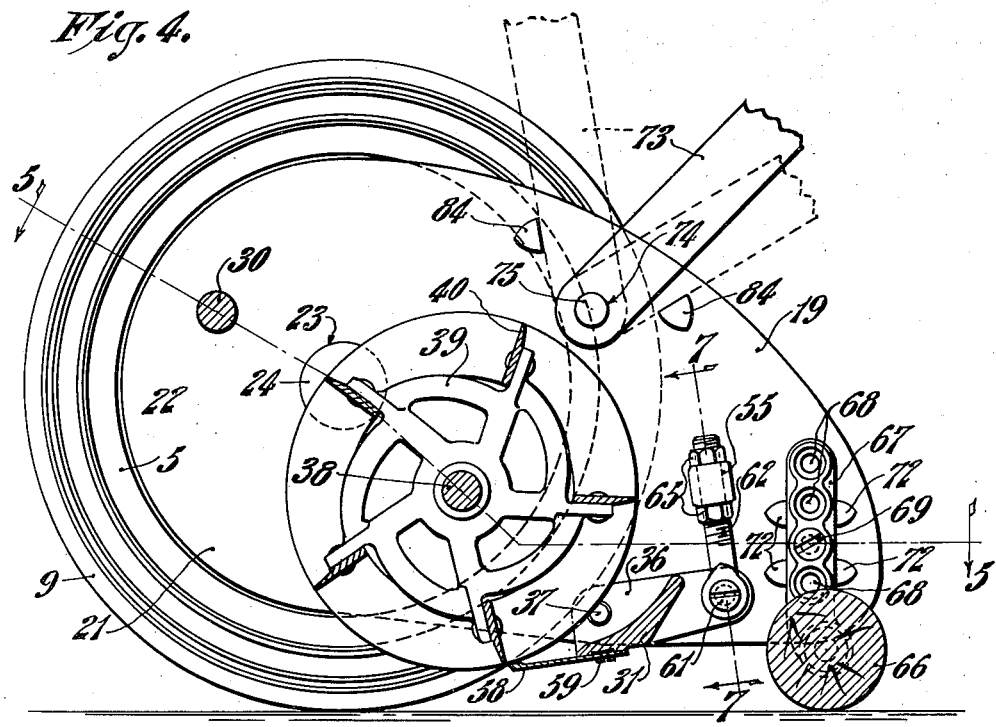
Fig. 4 is a cross sectional view taken on the line 4—4 of Fig. 1.
Figure 6:
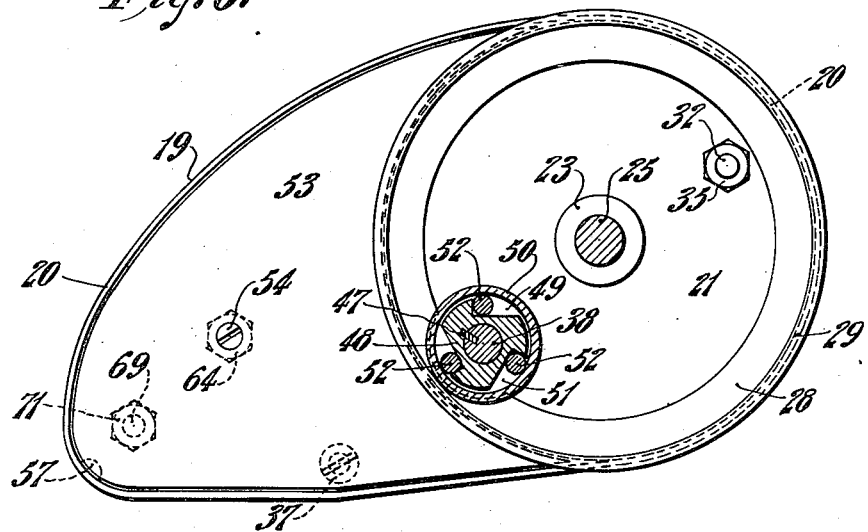
Fig. 6 is a sectional view taken on the line 6—6 of Fig. 5, with the wheel removed.
Figure 7:
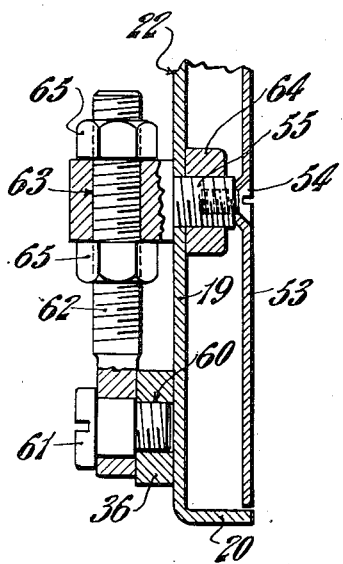
Fig. 7 is a detail sectional view, at enlarged scale, taken on the line 7—7 of Fig. 4.
Figure 8:
Fig. 8 is a perspective view of the rolling clutch locking member.

Side frames 19 are formed of pressed metal with an outwardly extending flange 20. The forward portion 21 of the side frames 19 are semicircular in shape, and when assembled with the wheels 1, are concentric therewith, and the frames 19 extend rearwardly from the forward portions 21 in a generally elliptical form, as best shown in Figs. 4 and 6, with the flange 20 reduced in width, relative to the forward portion. The inner surfaces 22 of the frames 19 are flat and smooth, as shown in Figs. 1, 4, and 5. This is an important feature of the invention, as it permits the ends of the cutting reel blades to be located close to the surface 22, thereby reducing the width of the "track," or the overall width between the ends of the reel blades and the outside of the tires. The side frames 19 are provided with sockets 23 for receiving flanges 24 of bearing studs 25, and the flanges 24 of the studs 25 are rigidly welded to the side frames 19. The studs 25 are provided, near their outer extremities, with grooves for receiving spring keeper rings 27 which removably secure the wheels on the studs, and the ends of the studs, beyond the grooves, are bevelled, as indicated in Fig. 5, to facilitate the removal and installation of the rings 27. A flanged guard ring 28 is secured on the inside of each of the frames 19, concentric with the stud 25, and formed with an outwardly extending flange 29 which, when the wheel is assembled on the frame, registers with the intersection of the flanges 4 and 5 on the wheel disc 1, thereby effectively sealing the inside of the wheel and preventing the entrance of grass clippings, dirt, or other foreign matter.

The side frames 19 are spaced from each other and held in proper alignment by cooperation of a brace rod or bar 30 and a knife bar 31. The ends 32 of the bar 30 project through openings 33 provided in the side frames 19, and are reduced in diameter to provide shoulders which abut against the surfaces 22 of the frames 19, as indicated in Fig. 5. The ends 32 are threaded to receive lock washers 34 and nuts 35 on the inside of the frames 19. The knife bar 31 is formed with end flanges 36 which abut against the surfaces 22 of the frames 19, and is secured to the frames 19 by engagement of pivot screws 37 in the flanges 36.

A cutting reel is provided, including a shaft 38 to which are secured in the usual manner spiders 39 which support helically curved reel blades 40. The shaft 38 is journalled in roller or ball bearings 41 which are pressed into sockets 42 formed in the frames 19, and the bearings 41 are protected by dust caps 43. The shaft 38 is accurately aligned with the bearings 41 by longitudinally adjustable, hardened cones 44. The cones 44 are located and fixed on the shaft 38 by cooperation of opposed set screws 45 engaging opposed slanted surfaces of recesses 46 formed in the shaft 38, as indicated in Fig. 5. Keys 47, secured in the shaft 38, engage clutch members 48 which are located in recesses 49 formed in pinions 50, and the pinions 50 are freely mounted on the shaft 38. The clutch member is milled to provide a plurality of longitudinal recesses 51 in which are freely located rolls 52. Thus, a rolling clutch is provided in each wheel which will drive the cutting reel when the lawn mower is pushed in a forward direction, but which will permit the reel to remain idle when the lawn mower is moved in a rearwardly direction. The bearings 41 are located in the side frames 19, relative to the studs 25, so that the pinions 50 will mesh with the ring gears 18 when the wheels are assembled on the frames.

Figure 9:
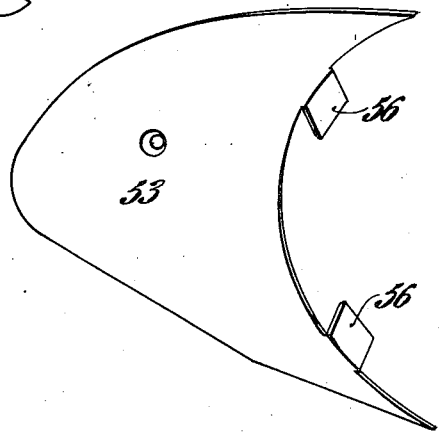
Fig. 9 is a perspective view of one of the closure plates for the side frames.

The portion of the side frame outside of the guard ring is closed, so that both inner and outer exposed surfaces of the frames are flush and smooth, by an outside plate 53, which is shaped to conform to the flange 20 of the side plate 19 and the guard ring 28, as best indicated in Figs. 6 and 9. The outside plate 53 is secured on the frame 19 by engagement of a flat head screw 54 in a block or stud 55, and is properly positioned by means of spacing lugs 56 which abut against the inner surface of the frame 19, and by engagement of the plate 53 on a button 57 secured in the frame 19.

A knife blade 58 is secured on the knife bar 31 by screws 59, in the usual manner, and the blade 58 extends forwardly into cooperating relation with the blades 40 of the cutting reel. The relation of the blade 58 and the reel blades 40 is controlled by adjustment of the knife bar 31. The end flanges 36 of the bar 31 extend rearwardly of the bar proper, and these extensions are provided with threaded holes 60 for receiving pivot studs 61. Adjusting eye bolts 62 are pivotally secured on the studs 61, and extend upwardly through bores 63 in the studs 55. The studs 55 are pivotally secured on the frames 19 by means of nuts 64. Nuts 65 at top and bottom of the stud 55 provide means for moving the eye bolt 62 up or down, and for locking the eye bolt in adjusted position. Movement of the eye bolt 62 will swing the knife bar 31 about its pivot studs 37. In its normal position, the axis of the eye bolt 62 is tangent to the center line of the pivot studs 37 and 61, thus reducing pivotal movement of the stud 55 to a minimum.

A roller 66 is journalled in bearing brackets 67, and the brackets 67 are provided with a plurality of countersunk holes 68 for receiving a flat head screw 69. The screw 69 projects through an opening 70 in the side plate 19, and is locked in place by a nut 71. The height of the lip of the knife 58 is controlled by the vertical position of the roller 66 and, as the roller 66 may be located in any one of four positions, vertically, depending upon the hole 68 in which the screw 69 is located, the lip of the knife 58 may be located in any one of four positions, relative to the ground, thereby providing for different heights of cut. As the screw 69 registers in the hole 70 in the side frame, it is impossible for the brackets 67 to slide up or down, and thus throw the roller 66 out of proper alignment. Opposed projections 72 pressed outwardly from the side frame 19 engage opposite sides of the bracket 67 to guide the same and hold the bracket from tipping. The nuts 71 are welded, or otherwise suitably secured, to the frames 19, so that the roller brackets 67 may be adjusted as to height without removing the outside plates 53. A rubber washer 66' is supported on each roller trunnion between the roller 66 and bracket 67 to provide for quiet operation.

Figures 2, 3:
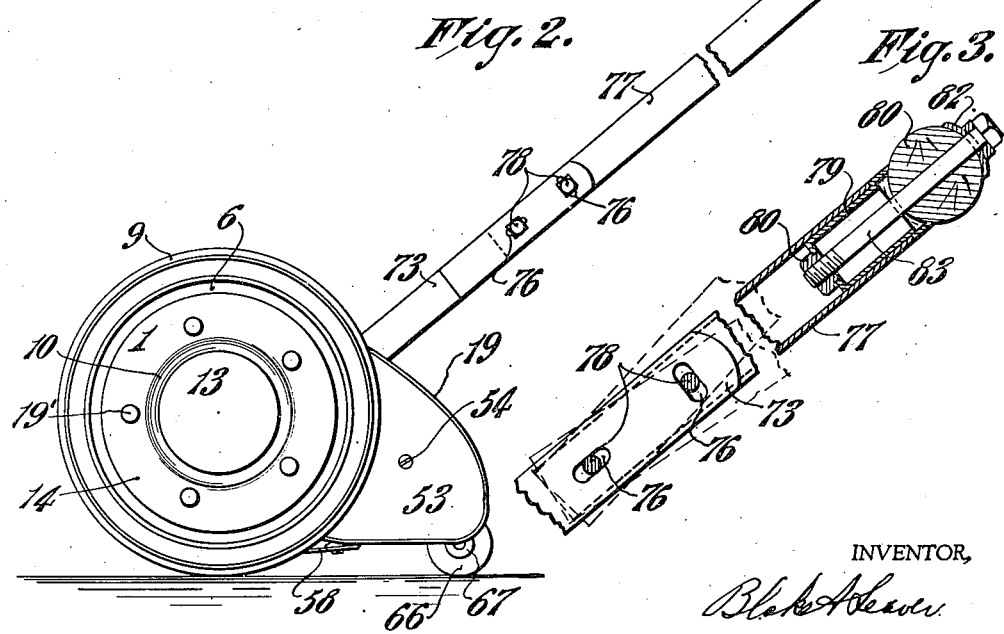
Fig. 2 is a side elevational view.
Fig. 3 is a sectional view through the handle, taken on the line 3—3 of Fig. 1.

Handle braces 73 are provided with holes 74 for pivotal engagement on studs 75 which are secured on the frames 19 and project inwardly therefrom. The opposite ends of the handle braces 73 are provided with spaced slots 76 whose long axes are perpendicular, and a handle tongue 77 is adjustably secured to the handle braces 73 by means of bolts 78. As shown in Fig. 3, the angle of the handle tongue 77, relative to the braces 73, may be altered by manipulation of the bolts 78 in the slots 76. The handle tongue 77 is preferably made of metal tubing, and a handle socket 79 is secured in its upper end by welding or other suitable means. A nut 80 is welded to the bottom of the handle socket 79, and a handle bar 81 is firmly secured on the socket 79 by means of a cap 82 and bolt 83. The angular relation of the handle to the lawn mower as a whole is limited by stop lugs 84 pressed inwardly from the side frames 19 to engage the handle braces 73. The stops 84 are so located that, in the upper position, the center of gravity of the handle will lie ahead of the pivot stud 75, and the handle will remain in this position, and, in the lower position, the handle will lie below the lowest operating angle and still be prevented from falling to the ground.

What I claim is:

1. A side frame for lawn mowers comprising a stamped, outwardly flanged member having a flat, smooth inner surface, a wheel stud secured on said member and projecting outwardly therefrom, a stamped metal, flanged guard ring secured on the outer surface of said member in coaxial relation with said stud, and a plate secured in said member flush with the edge of the flange of said member and abutting said guard ring, whereby said side frame outside of said guard ring is provided with smooth, flat inner and outer surfaces, substantially as described.

2. A side frame for lawn mowers comprising, in combination, a stamped metal, outwardly flanged frame member having a semi-circular front portion and an elliptical rear portion, said frame member also having an inner surface which is substantially flat and in one plane, a wheel stud secured on said frame in coaxial relation with said semi-circular portion and projecting outwardly from said frame, said frame being formed with a socket for receiving a reel bearing, a stamped metal, flanged guard ring secured on the outer surface of said frame in coaxial relation with said wheel stud and enclosing said bearing socket, and a plate secured on the elliptical portion of said frame flush with the edge of the flange of said frame and substantially filling that portion of said frame which lies outside of said guard ring.

BLAKE A. SEAVER.